United States Patent
Tanaka et al.

(10) Patent No.: US 7,688,293 B2
(45) Date of Patent: Mar. 30, 2010

(54) DISPLAY APPARATUS AND IN-VEHICLE DISPLAY APPARATUS

(75) Inventors: Shinya Tanaka, Kobe (JP); Youichi Nagahama, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 232 days.

(21) Appl. No.: 11/712,517

(22) Filed: Mar. 1, 2007

(65) Prior Publication Data
US 2007/0242010 A1    Oct. 18, 2007

(30) Foreign Application Priority Data
Apr. 14, 2006    (JP)    ............................. 2006-112442

(51) Int. Cl.
*G09G 3/36*    (2006.01)
(52) U.S. Cl. .................. 345/87; 345/905; 248/27.1; 307/9.1
(58) Field of Classification Search ............... 345/156, 345/102, 87, 204, 905; 361/681, 58, 679.27, 361/679.44, 679.12, 31, 36; 312/319.5, 7.2; 349/61, 64, 65; 248/27.1, 551; 307/9.1, 307/10.1
See application file for complete search history.

(56) References Cited

U.S. PATENT DOCUMENTS

| | | |
|---|---|---|
| 5,381,684 A | 1/1995 | Kawamura |
| 5,450,292 A | 9/1995 | Yokoyama et al. |
| 5,453,855 A | 9/1995 | Nakamura et al. |
| 5,581,683 A | 12/1996 | Bertignoll et al. |
| 5,828,415 A | 10/1998 | Keating et al. |
| 5,936,596 A | 8/1999 | Yoshida et al. |
| 6,046,849 A | 4/2000 | Moseley et al. |
| 6,055,013 A | 4/2000 | Woodgate et al. |
| 6,055,103 A | 4/2000 | Woodgate et al. |
| 6,104,451 A | 8/2000 | Matsuoka et al. |
| 6,108,060 A | 8/2000 | Funamoto et al. |
| 6,377,295 B1 | 4/2002 | Woodgate et al. |
| 6,437,915 B2 * | 8/2002 | Moseley et al. ............. 359/465 |

(Continued)

FOREIGN PATENT DOCUMENTS

EP    0 829 744 A2    3/1998

(Continued)

OTHER PUBLICATIONS

S. Tanaka et al., "Display Apparatus," U.S. Appl. No. 11/520,748, filed Sep. 14, 2006.

(Continued)

*Primary Examiner*—Kevin M Nguyen
(74) *Attorney, Agent, or Firm*—Oliff & Berridge, PLC

(57) ABSTRACT

A display apparatus includes a main body that includes an operating portion at a front surface thereof, and a display portion that includes a display screen visible when the display portion covers the front surface of the main body, and that exposes the operating portion when the display portion is moved from the front surface of the main body, and a thickness from the display screen to a back surface at one side of the display portion, which is brought into proximity to the main body when the operating portion is exposed, is made smaller than that from the display screen to the back surface at another side of the display portion.

10 Claims, 16 Drawing Sheets

U.S. PATENT DOCUMENTS

| | | |
|---|---|---|
| 6,512,607 B1 | 1/2003 | Windsor et al. |
| 6,545,655 B1 | 4/2003 | Fujikawa |
| 6,624,863 B1 | 9/2003 | Jacobs et al. |
| 6,628,352 B1 * | 9/2003 | Sumida et al. ............... 349/61 |
| 6,731,416 B2 | 5/2004 | Hazzard |
| 6,954,185 B2 | 10/2005 | Ogino |
| 6,960,001 B2 | 11/2005 | Nitto et al. |
| 7,030,944 B2 | 4/2006 | Fujimoto |
| 7,151,532 B2 | 12/2006 | Schulz |
| 7,167,222 B2 | 1/2007 | Inoue et al. |
| 7,250,710 B2 | 7/2007 | Gilmour et al. |
| 7,292,296 B2 | 11/2007 | Kanbe et al. |
| 7,337,450 B2 * | 2/2008 | Sato et al. ................. 720/647 |
| 7,354,163 B2 | 4/2008 | Suzuki et al. |
| 2001/0043302 A1 | 11/2001 | Inoue et al. |
| 2002/0001128 A1 | 1/2002 | Moseley et al. |
| 2002/0101117 A1 * | 8/2002 | Shibuya ..................... 307/9.1 |
| 2003/0085659 A1 | 5/2003 | Overmann et al. |
| 2003/0142249 A1 | 7/2003 | Fujimoto |
| 2004/0119896 A1 | 6/2004 | Kean et al. |
| 2004/0263060 A1 | 12/2004 | Gilmour et al. |
| 2004/0263717 A1 * | 12/2004 | Hsu et al. ..................... 349/62 |
| 2005/0052529 A1 | 3/2005 | Mashitani et al. |
| 2005/0111100 A1 * | 5/2005 | Mather et al. ............... 359/464 |
| 2005/0174658 A1 | 8/2005 | Long et al. |
| 2006/0066507 A1 | 3/2006 | Yanagisawa |
| 2006/0191177 A1 | 8/2006 | Engel |
| 2006/0192746 A1 | 8/2006 | Ioki et al. |

FOREIGN PATENT DOCUMENTS

| | | |
|---|---|---|
| GB | 2 405 545 A | 3/2005 |
| GB | 2 405 546 A | 3/2005 |
| JP | A-05-055623 | 5/1993 |
| JP | A-5-246285 | 9/1993 |
| JP | A-6-186526 | 7/1994 |
| JP | A-6-236152 | 8/1994 |
| JP | A-7-103778 | 4/1995 |
| JP | A-9-46622 | 2/1997 |
| JP | A 10-123461 | 5/1998 |
| JP | A-10-130537 | 5/1998 |
| JP | A-11-52105 | 2/1999 |
| JP | A-11-52372 | 2/1999 |
| JP | A 11-84131 | 3/1999 |
| JP | A-11-88245 | 3/1999 |
| JP | A-11-95167 | 4/1999 |
| JP | A-11-109339 | 4/1999 |
| JP | A-11-248466 | 9/1999 |
| JP | A-11-331876 | 11/1999 |
| JP | A-11-339527 | 12/1999 |
| JP | A-2000-36927 | 2/2000 |
| JP | A-2000-47195 | 2/2000 |
| JP | A-2000-076838 | 3/2000 |
| JP | A-2000-137443 | 5/2000 |
| JP | A 2000-162979 | 6/2000 |
| JP | A-2000-180834 | 6/2000 |
| JP | A-2000-261731 | 9/2000 |
| JP | A-2001-083903 | 3/2001 |
| JP | A-2001-283926 | 10/2001 |
| JP | A-2001-311944 | 11/2001 |
| JP | A-2002-234399 | 8/2002 |
| JP | A-2003-121847 | 4/2003 |
| JP | A-2003-137005 | 5/2003 |
| JP | A-2003-196682 | 7/2003 |
| JP | A-2003-197018 | 7/2003 |
| JP | A-2003-337326 | 11/2003 |
| JP | A-2004-79488 | 3/2004 |
| JP | B2-3503925 | 3/2004 |
| JP | A-2004-233816 | 8/2004 |
| JP | A-2004-348204 | 12/2004 |
| JP | A-2005-71286 | 3/2005 |
| JP | A-2005-73076 | 3/2005 |
| JP | A 2005-78080 | 3/2005 |
| JP | A-2005-86773 | 3/2005 |
| JP | A-2005-255090 | 9/2005 |
| JP | A-2005-284592 | 10/2005 |
| JP | A-2005-313782 | 11/2005 |
| JP | 2006064733 * | 3/2006 |
| JP | A 2006-64733 | 3/2006 |
| JP | A-2006-76369 | 3/2006 |
| JP | A-2006-131227 | 5/2006 |
| JP | A-2006-151363 | 6/2006 |
| JP | A-2006-151364 | 6/2006 |
| KR | 2000-0008458 | 2/2000 |
| KR | 10-2005-0008173 | 1/2005 |
| WO | WO 97/42540 | 11/1997 |
| WO | WO 2004/011987 A1 | 2/2004 |
| WO | WO 2004/016460 A1 | 2/2004 |

OTHER PUBLICATIONS

S. Tanaka et al., "Display Apparatus," U.S. Appl. No. 11/520,743, filed Sep. 14, 2006.
S. Tanaka, "Display Apparatus," U.S. Appl. No. 11/520,670, filed Sep. 14, 2006.
S. Tanaka et al., "In-Vehicle Display Apparatus and Display Control Method Therefor," U.S. Appl. No. 11/583,076, filed Oct. 19, 2006.
S. Tanaka, "Liquid Crystal Display Apparatus," U.S. Appl. No. 11/488,064, filed Jul. 18, 2006.
S. Tanaka, "Display Device and Display Method," U.S. Appl. No. 11/299,657, filed Dec. 13, 2005.
M. Maehata et al., "Receiver," U.S. Appl. No. 11/475,216, filed Jun. 27, 2006.
"Fujitsu Ten Technical Report", vol. 23, No. 2, Dec. 2005, pp. 22-27.
"Fujitsu Ten Technical Journal," No. 26, Jan. 2006, pp. 17-22.

* cited by examiner

Related Art

Related Art

DISPLAY APPARATUS AND IN-VEHICLE DISPLAY APPARATUS

BACKGROUND OF THE INVENTION

1. Field of the Invention

This invention generally relates to display apparatuses and in-vehicle display apparatuses, and more particularly, to a display apparatus and an in-vehicle display apparatus in which a display portion moves with respect to a main body.

2. Description of the Related Art

In recent years, display apparatuses have been rapidly widespread so as to watch car navigation maps or video images in vehicles. For example, an in-vehicle display apparatus is, in most cases, located in a dashboard part between the driver and the front-seat passenger. The in-vehicle apparatus is required to have a determined size, as viewed from the front surface. However, the display screen is demanded to be large at the same time. FIG. 1 and FIG. 2 respectively show the in-vehicle display apparatus. The in-vehicle display apparatus is composed of: a display portion 100 that includes a display screen 102 and an operation button portion 150; and a main body 152 formed of a different chassis from the display portion 100. As shown in FIG. 1, the display portion 100 is provided in a stand-up manner with respect to the main body 152, and the back surface thereof covers the front surface of the main body 152. The display portion 100 displays images on the display screen in such state.

Referring now to FIG. 2, the display portion 100 is moved from the front surface of the main body 152, by tilting the display portion 100. The display portion 100 is made to face upward with the top side thereof situated at the side of the main body 152. An operating portion 154 is provided at the front surface of the main body 152. The operating portion 154 includes: an insertion slot 155 for, for example, Compact Disc (CD)/Digital Versatile Disc (DVD), an insertion slot 156 for Mini Disc (MD), a connector insertion slot 157 for a build-in Hard Disc Drive (HDD), an operation switch of a storage medium such as a memory card or the like, and other switches. When the display portion 100 is moved to face upward and laid down with respect to the front surface of the main body 152, the operating portion 154 provided at the front surface of the main body 152 is exposed, thereby allowing a user to operate the operating portion 154.

The in-vehicle display apparatus shown in FIG. 1 and FIG. 2 includes: the display portion 100; and the main body 152. As shown in FIG. 1, when the display portion 100 displays an image, the display portion 100 covers the front surface of the main body 152 with the size of the display screen 102 of the display portion 100 substantially identical to the size viewed from the front surface thereof. Meanwhile, as shown in FIG. 2, the operating portion 154 is arranged at the front surface of the main body 152. The display portion 100 is moved downward and tilted as the arrow indicates, so that the top portion of the display portion 100 is moved toward the bottom portion of the main body 152. Then, the operating portion 154 can be operated. At this time, a drive pin, not shown, formed at the side surface of the display portion 100 moves along a drive groove 153 formed in the main body 152, so that the display portion 100 moves from the front surface of the main body 152 to expose the operating portion 154. As stated, the size of the display screen 102 of the display portion 100 is configured to be substantially identical to that viewed from the front surface of the display apparatus, and the operating portion 154 can be operated.

There has been known a multi-view display with a liquid crystal panel having a parallax barrier on the front side thereof, as a so-called multi-view display having a common display screen, on which different images are respectively visible from different viewing directions (view angles). Different information (images) can be displayed on the right and left sides of the display screen by separating directions of lights through a backlight on a pixel basis (for example, as disclosed in Japanese Patent Application Publication No. 2005-78080). Such display is mounted on a vehicle, allowing the front-seat passenger to watch a TV program or another image, while the driver is checking a navigation map image.

With respect to the in-vehicle display apparatus shown in FIG. 1 and FIG. 2, when the display portion 100 is tilted and moved from the front surface of the main body 152, the display portion 100 keeps facing upward and partially covers a portion of the front surface of the main body 152. This limits the region that can be used as the operating portion 154 arranged at the front surface of the main body 152. For example, the lights through the backlight are separated into left and right images, for example, when the multi-view display apparatus is employed for the in-vehicle display apparatus. So, there is a demand for an increase in the brightness of the backlight to increase the brightness of the backlight. In order to increase the brightness of the backlight, however, there should be provided a number of light emitting portions such as fluorescent tubes, white LEDs, or the like serving as light sources, thereby making the display portion 100 thicker. This also limits the region that can be used as the operation portion 154 arranged at the front surface of the main body 152.

In addition, when the storage medium such as CD, DVD, MD, or the like is inserted into or ejected from the insertion portion, the top portion of such moved and tilted display portion 100 gets in the way. For this reason, the display portion 100 needs to be moved and tilted sufficiently to be substantially vertical to the front surface of the main body 152. However, it takes time to drive the display portion 100 to the position where the display portion 100 is not in the way. This may make an operator feel uncomfortable.

SUMMARY OF THE INVENTION

The present invention has been made in view of the above circumstances and provides a display apparatus and an in-vehicle display apparatus in which a region to be used as an operating portion on a front surface of a main body thereof can be enlarged and the front surface of the main body, when exposed, can be enlarged with the movement of the display portion suppressed to minimum.

According to one aspect of the present invention, there is provided a display apparatus including: a main body that includes an operating portion at a front surface thereof; and a display portion that includes a display screen visible when the display portion covers the front surface of the main body, and that exposes the operating portion when the display portion is moved from the front surface of the main body, and a thickness from the display screen to a back surface at one side of the display portion, which is brought into proximity to the main body when the operating portion is exposed, is made smaller than that from the display screen to the back surface at another side of the display portion. When the display portion is moved from the front surface of the main body to operate the operating portion, one side of the display portion that covers the front surface of the main body is thin, thereby enabling the region to be used as the operating portion to be enlarged. The front surface of the main body, when exposed, can be enlarged with the movement of the display portion suppressed to minimum.

According to another aspect of the present invention, there is provided an in-vehicle display apparatus including: a main body that includes an insertion slot at a front surface thereof to insert or eject a storage medium into or from; a display portion arranged to cover the front surface of the main body; and a driving portion that moves and tilts a top portion of the display portion downward to a bottom portion of the main body to expose the front surface of the main body, and a thickness from a display screen to a back surface at the top portion of the display portion is made smaller than that from the display screen to the back surface at the bottom portion of the display portion. In an in-vehicle display apparatus that has the display portion covering the front surface of the main body with an insertion slot of a storage medium arranged at the front surface of the main body, it is easy to insert or eject the storage medium into or from the insertion slot. In addition, the front surface of the main body, when exposed, can be enlarged with the movement of the display portion suppressed to minimum.

BRIEF DESCRIPTION OF THE DRAWINGS

Preferred exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

First Exemplary Embodiment

Figure 3A:
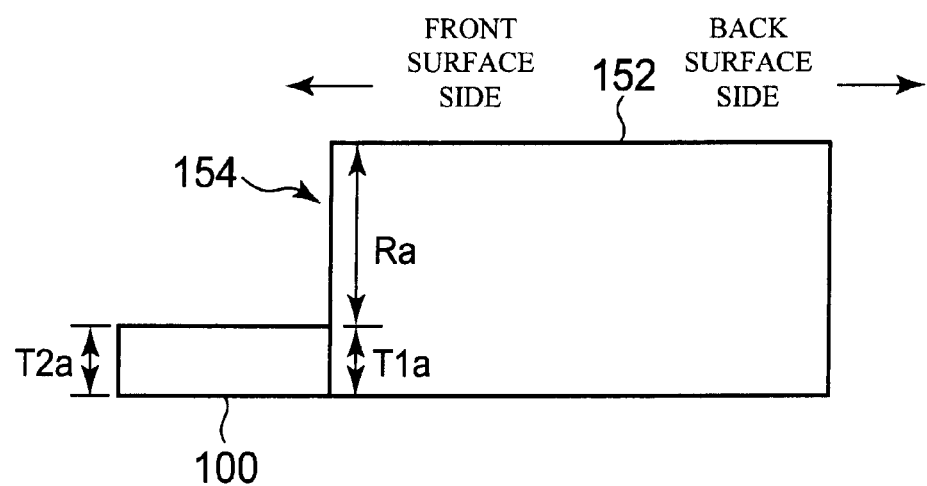
FIG. 3A is a side view of the conventional display apparatus.
Figure 3B:
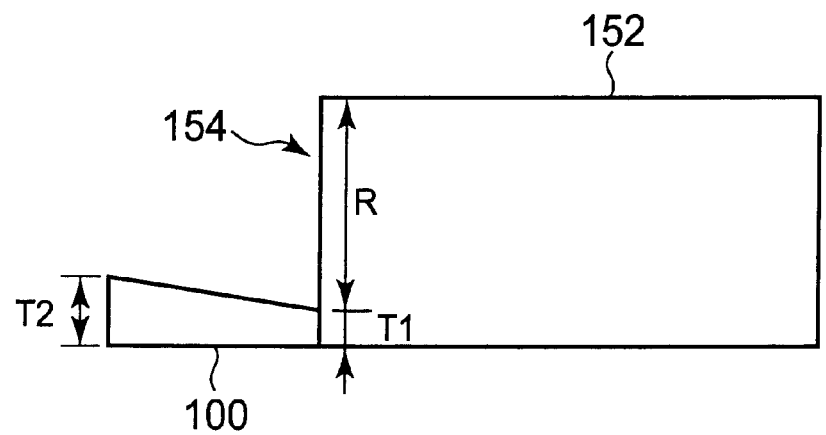
FIG. 3B is a side view of a display apparatus employed in a first exemplary embodiment of the present invention.

A first exemplary embodiment of the present invention is an example in which a multi-view display is for use in an in-vehicle display apparatus. FIG. 3A and FIG. 3B schematically show the principle employed in the present invention. FIG. 3A is a side view of the conventional display apparatus. The display portion 100 is laid down and partially covers the front surface of the main body 152. In the display portion 100 of the conventional display apparatus, the top portion of the display portion 100, namely, one side of the display portion 100 brought into proximity of the main body 152 when the operating portion 154 is exposed, has a thickness T1$a$, which is substantially identical to a thickness T2$a$, which is the thickness of another side arranged at the opposite side of the display portion 100. In the afore-mentioned case, a region Ra can be used for the operating portion 154 in the front surface of the main body 152. FIG. 3B is a side view of the display apparatus employed in a first exemplary embodiment of the present invention. In the first exemplary embodiment, a thickness T1 of the top portion of the display portion 100 is thinner than a thickness T2. This makes it possible to enlarge a region R that can be used as the operating portion 154 in the front surface of the main body 152, as compared to the region Ra shown in FIG. 3A.

Figure 4:
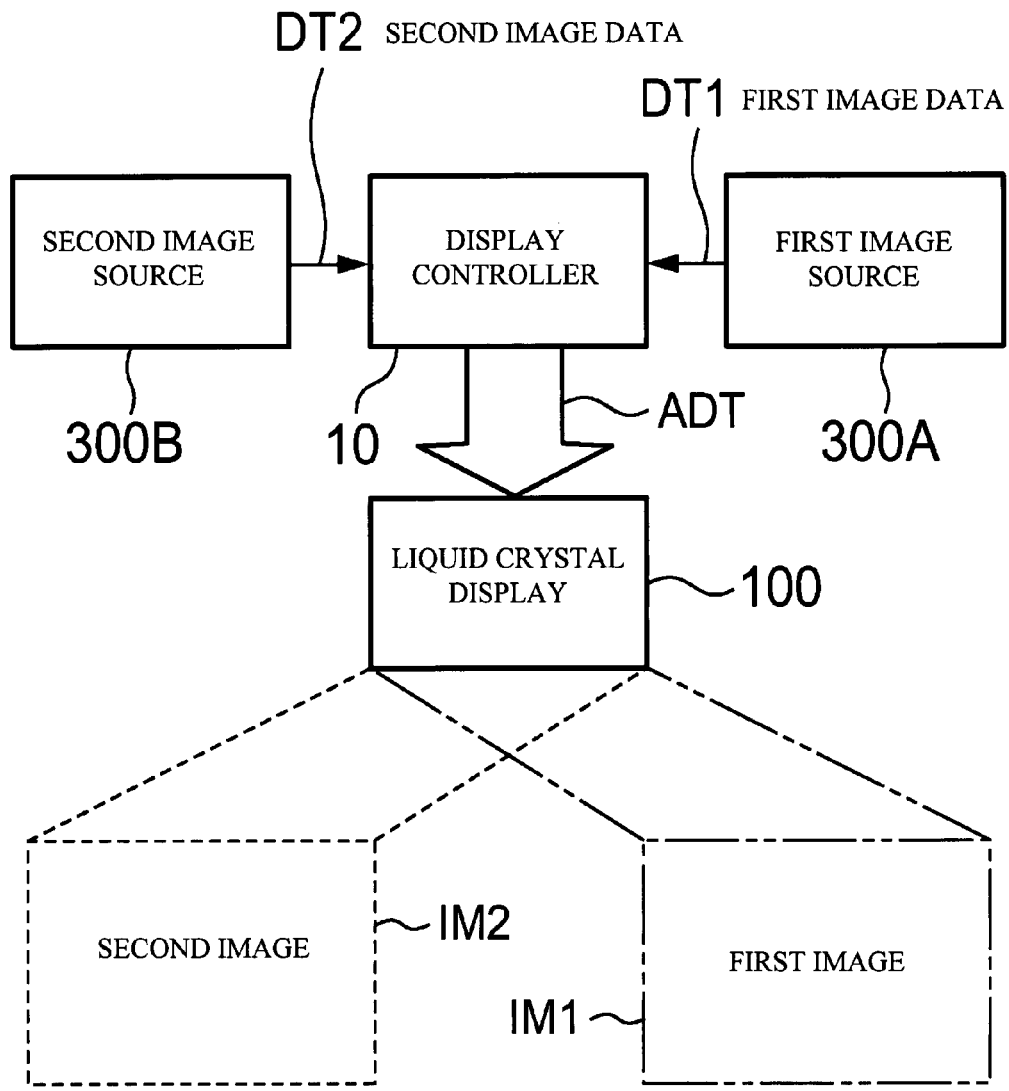
FIG. 4 is a view illustrating a basic configuration of a multi-view display apparatus in accordance with the first embodiment of the present invention.
Figure 4:
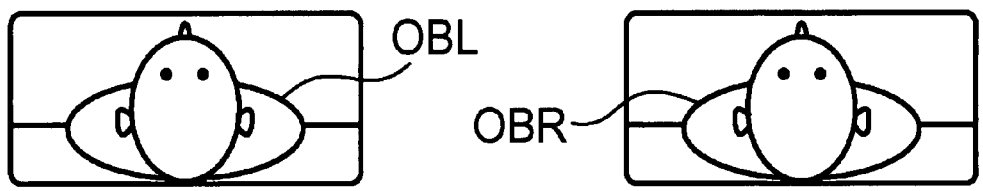

A description will now be given of a specific configuration of the display apparatus employed in the first exemplary embodiment of the present invention. FIG. 4 is a view illustrating a basic configuration of a multi-view display apparatus in accordance with the first exemplary embodiment of the present invention. In the first exemplary embodiment, a description will be given of an example in which the display apparatus is mounted in a vehicle. Referring now to FIG. 4, the multi-view display apparatus includes: a display controller 10 that serves as a display control portion; and the display portion 100. To the display controller 10, image data DT1 is supplied from a first image source 300A that serves as a supply source, and at the same time, image data DT2 is also supplied from a second image source 300B that serves as a supply source. Then, image data ADT, which is composed of the first image data DT1 and the second image data DT2, is output to the common display portion 100. The configuration of the display controller 10 will be described later in detail. The first image source 300A and the second image source 300B are respectively composed of a camera, TV receiver, DVD reproducing portion, HD reproducing portion, navigation portion, and the like, as will be described later.

The display portion 100 includes: a liquid crystal panel; a backlight; a parallax barrier; and the like, as will also be described later. A first image IM1 based on the first image data DT1 and a second image IM2 based on the second image data DT2 are displayed on a common display screen so that an observer OBR can watch the first image IM1 from a right-hand direction and an observer OBL can watch the second-image IM2 from a left-hand direction. The configuration of the display portion 100 will also be described later in detail.

Figure 5:
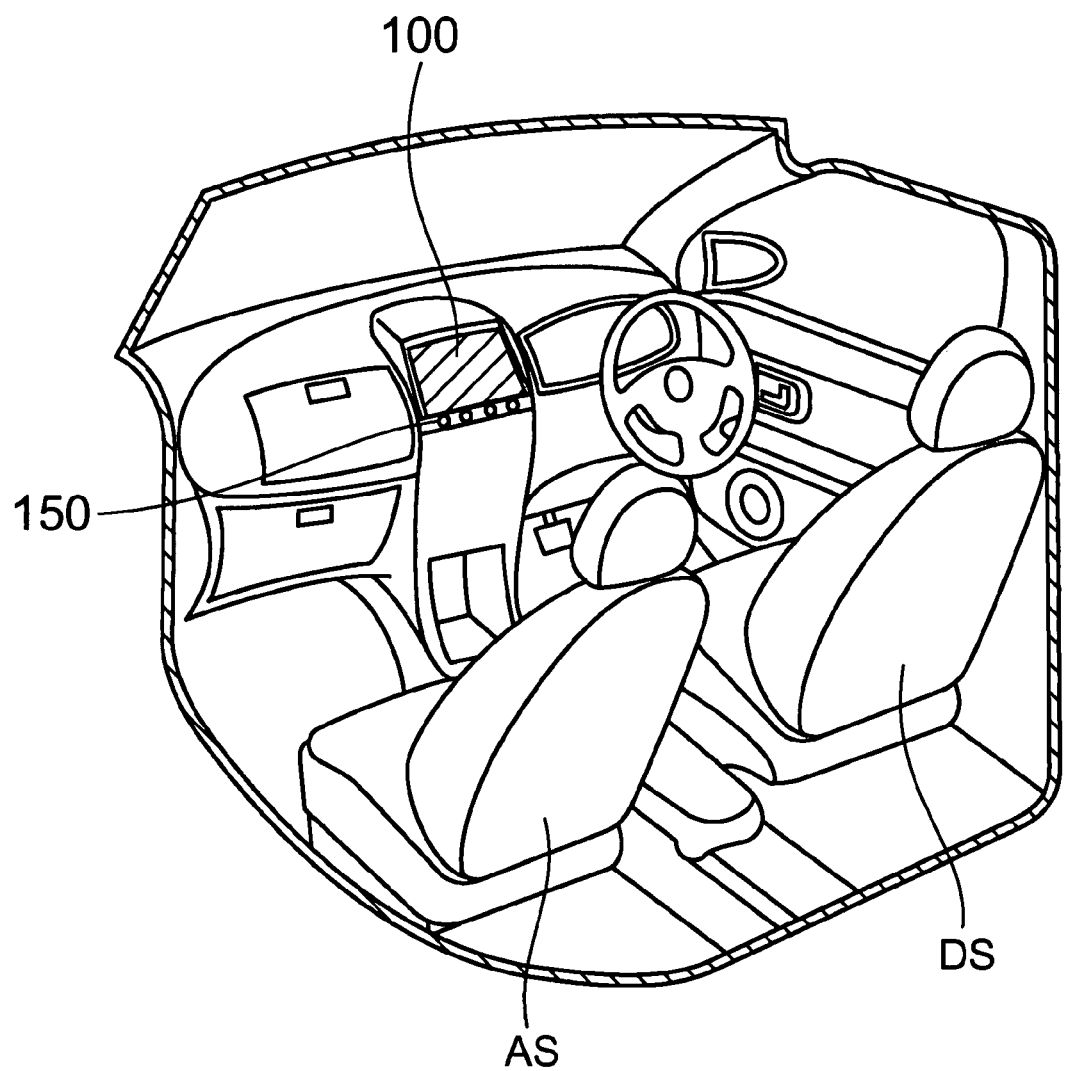
FIG. 5 is a perspective view showing an example in which the display apparatus is applied to a vehicle in accordance with the first embodiment of the present invention.

Referring now to FIG. 5, the display portion 100, for example, of the display apparatus employed in the first exemplary embodiment is arranged between a driver's seat DS and a front passenger's seat AS in a dashboard area of the vehicle.

In addition, the display portion 100 is provided with the operation button portion 150 so as to manually operate the display apparatus. According to an exemplary embodiment shown in FIG. 5, a passenger who sits on the driver's seat DS corresponds to the above-described observer OBR, and another passenger who sits on the front passenger's seat AS corresponds to the above-described observer OBL. Those passengers are able to simultaneously watch individual images, namely, the first image IM1 and the second image IM2, which are respectively different and displayed on the display portion 100, from the driver's seat DS and from the front passenger's seat AS.

Figure 6:
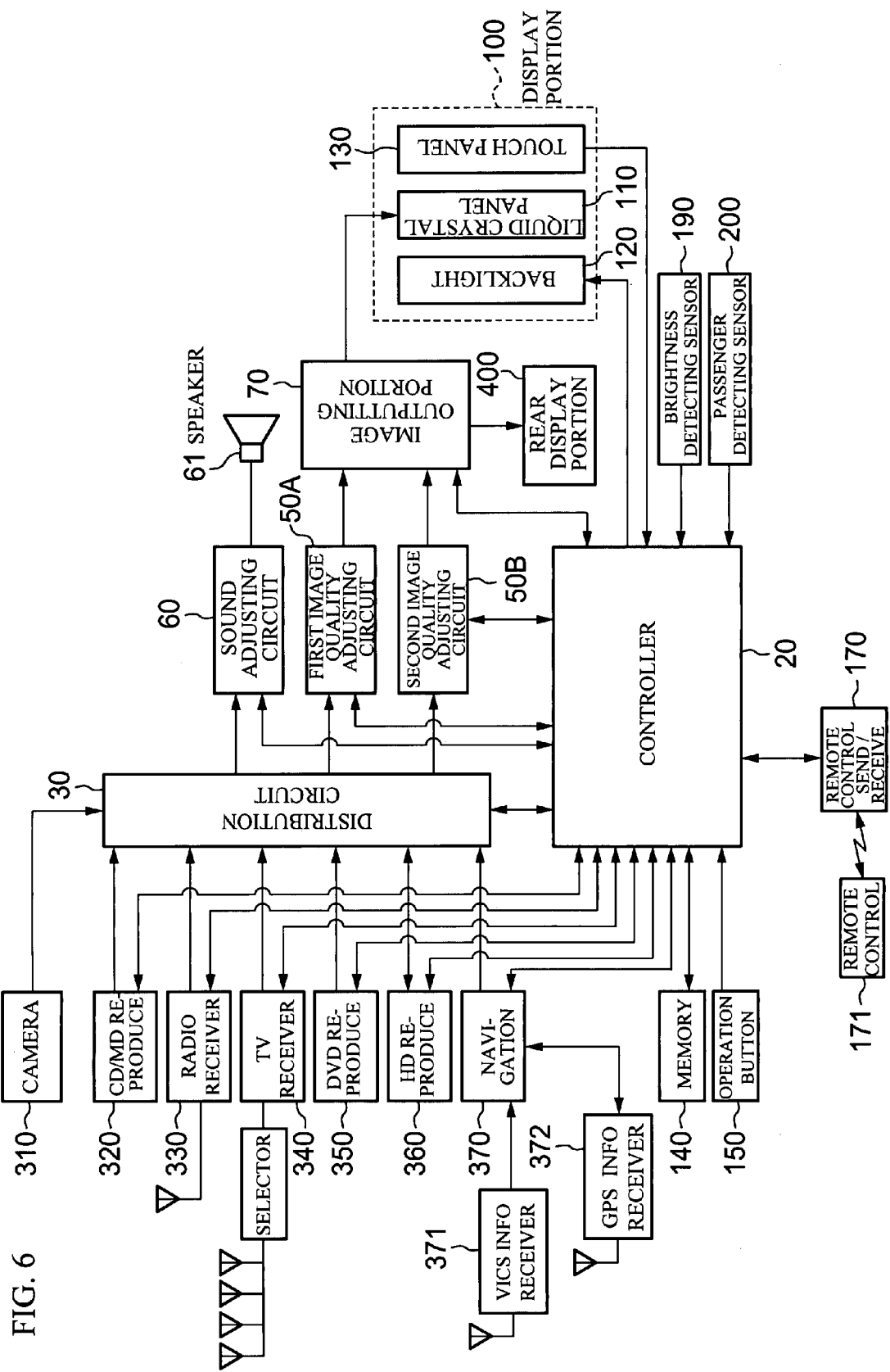
FIG. 6 is a functional block diagram of the display apparatus in accordance with the first embodiment of the present invention.
Figure 7:
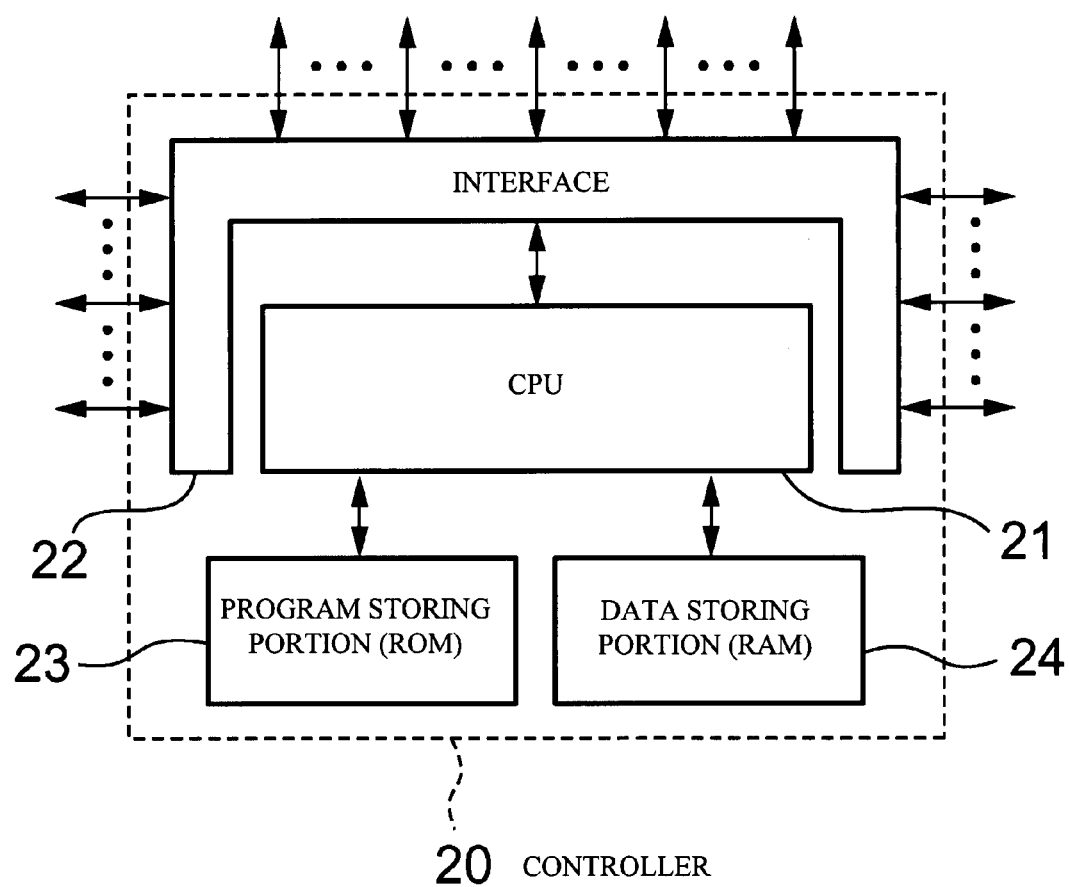
FIG. 7 is a functional block diagram showing a configuration of a controller in accordance with the first embodiment of the present invention.
Figure 8:
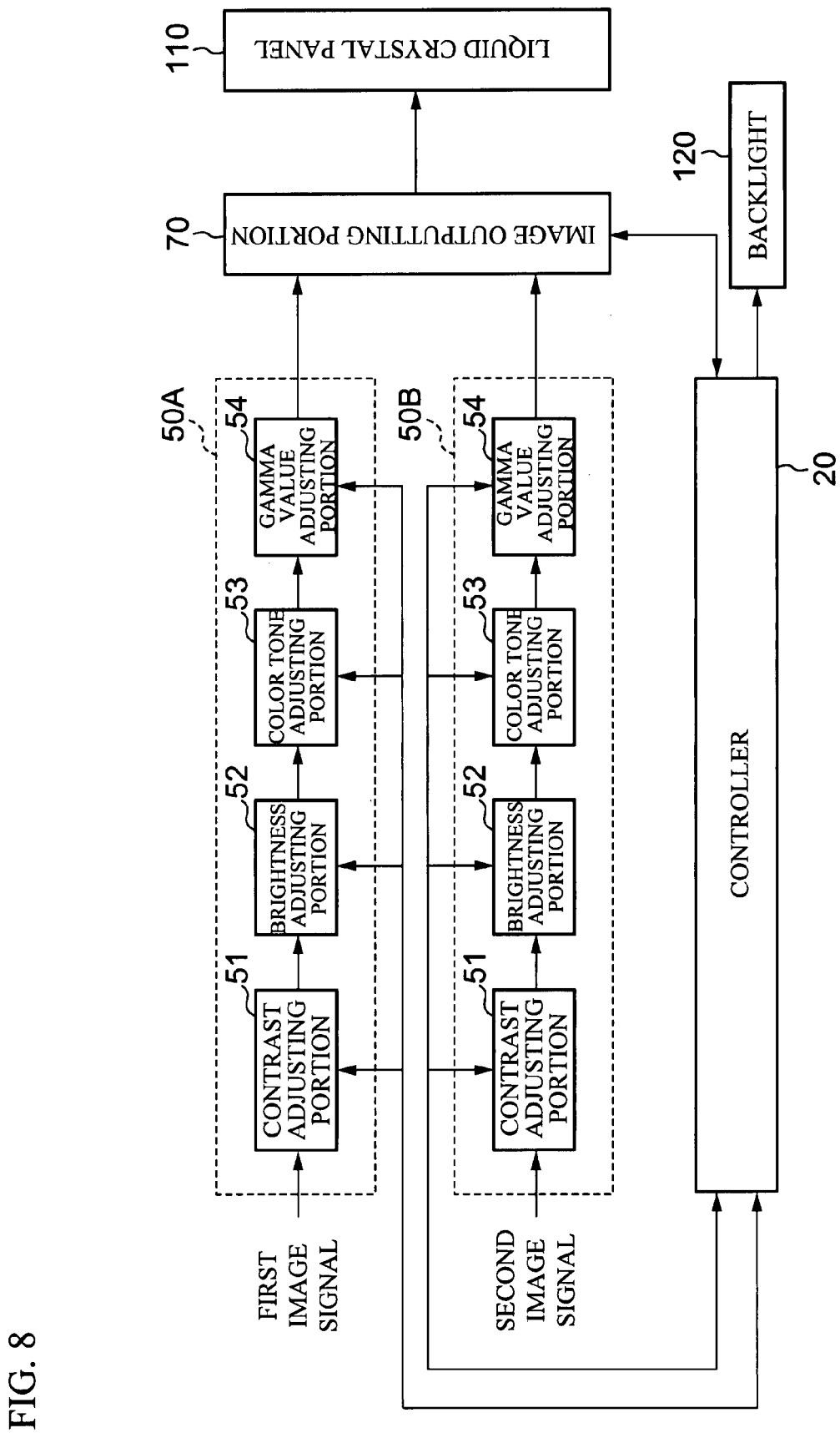
FIG. 8 is a functional block diagram of first and second image quality adjusting circuits in accordance with the first embodiment of the present invention.
Figure 9:
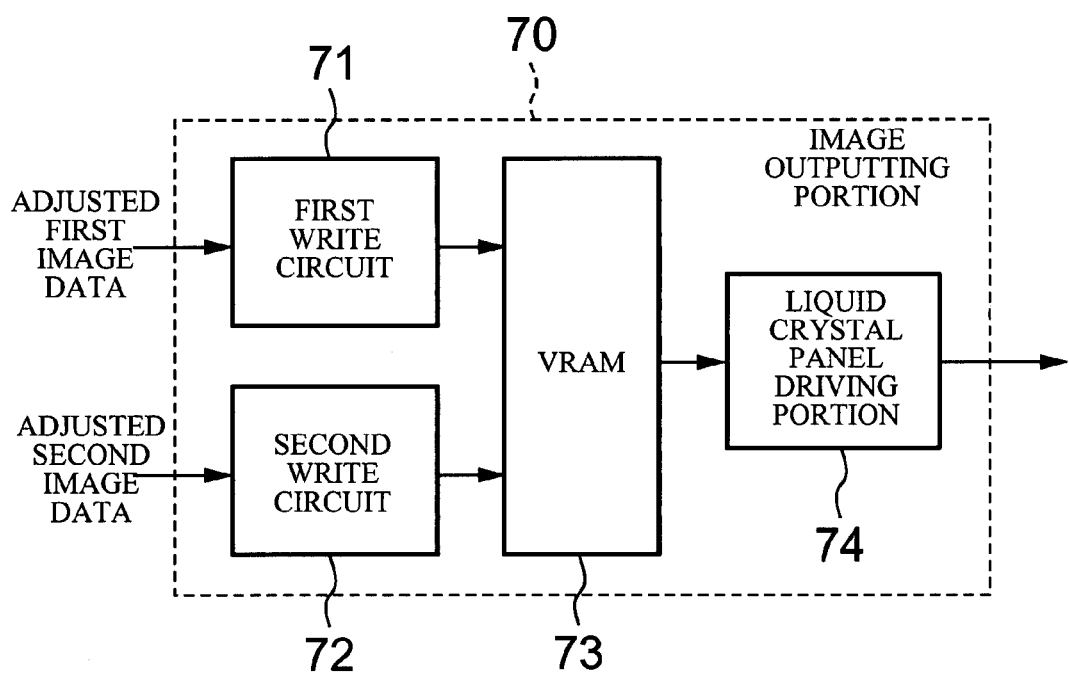
FIG. 9 is a functional block diagram of an image outputting portion in accordance with the first embodiment of the present invention.
Figure 10:
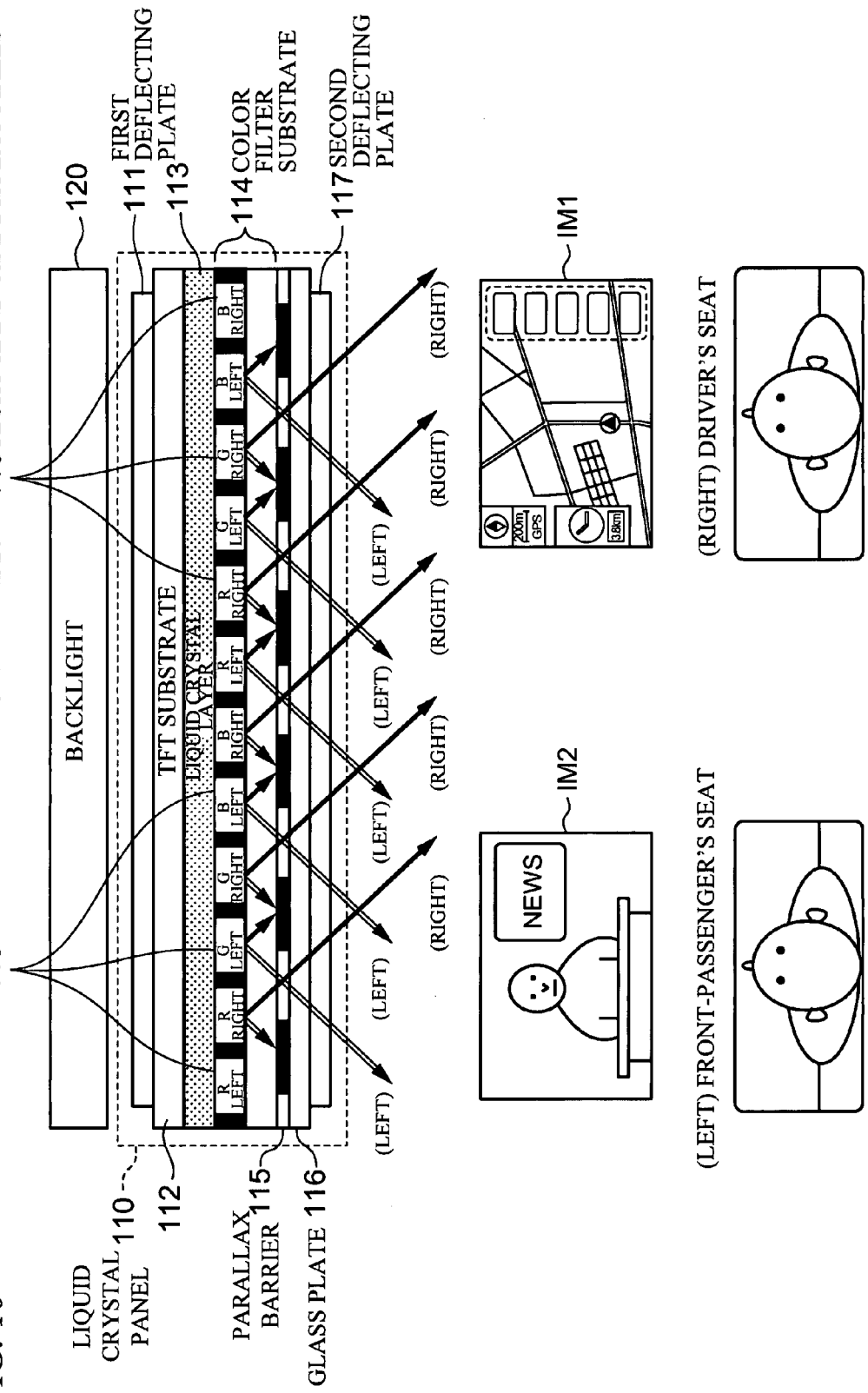
FIG. 10 is a view illustrating a cross-sectional configuration and effects of a liquid crystal panel in accordance with the first embodiment of the present invention.
Figure 11:
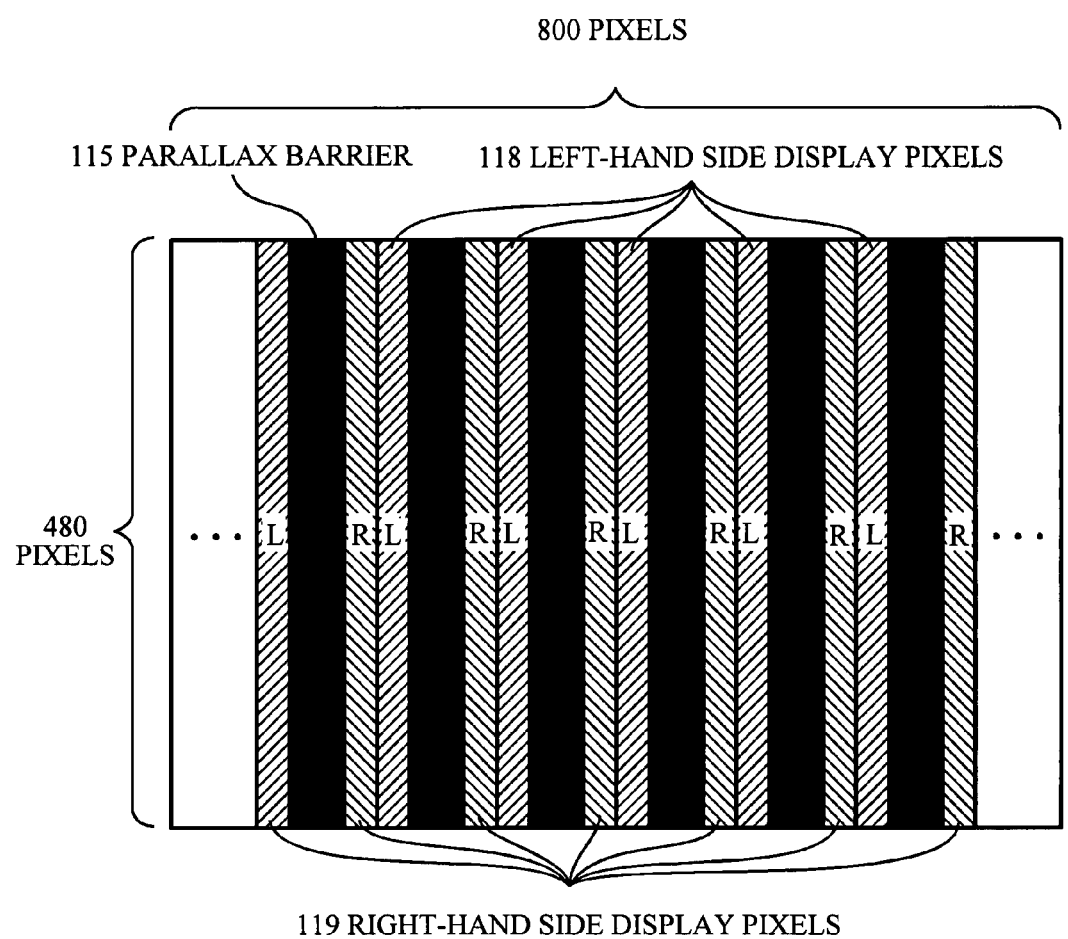
FIG. 11 is a front view of the liquid crystal panel in accordance with the first embodiment of the present invention.
Figure 12:
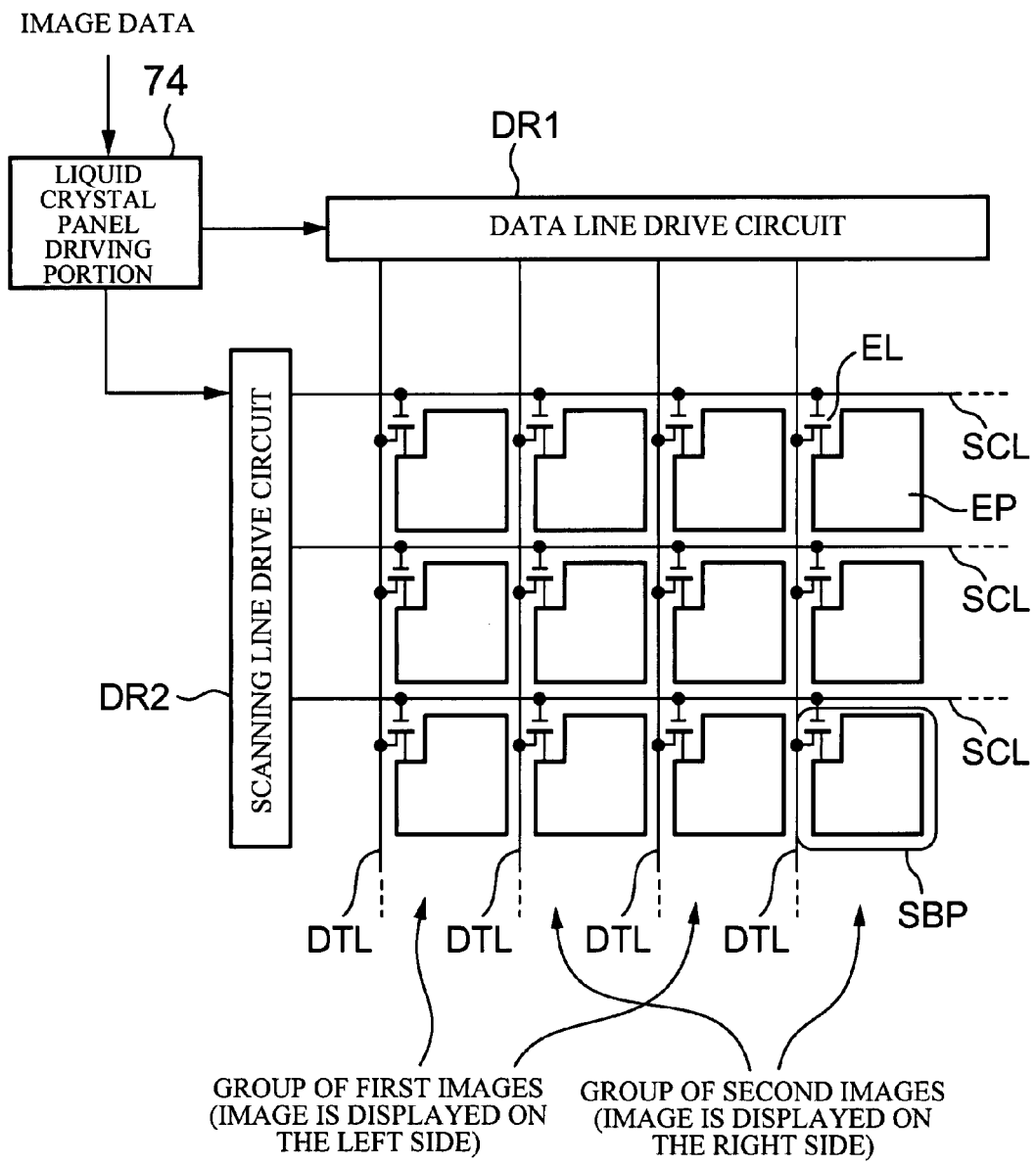
FIG. 12 is a circuit diagram of a TFT substrate in accordance with the first embodiment of the present invention.

FIG. 6 through FIG. 12 illustrate specific configurations of the display apparatus in accordance with the first exemplary embodiment of the present invention. FIG. 6 is a functional block diagram of the display apparatus. FIG. 7 is a functional block diagram showing a configuration of the controller. FIG. 8 is a functional block diagram of first and second image quality adjusting circuits. FIG. 9 is a functional block diagram of an image outputting portion. FIG. 10 is a view illustrating a cross-sectional configuration and effects of a liquid crystal panel. FIG. 11 is a front view of the liquid crystal panel. FIG. 12 is a circuit diagram of a TFT substrate.

Referring now to FIG. 6, the display apparatus includes the display portion 100, a controller 20, a distribution circuit 30, a first image quality adjusting circuit 50A, a second image quality adjusting circuit 50B, an image outputting portion 70, and the like. The display controller 10 includes the controller 20, the distribution circuit 30, the first image quality adjusting circuit 50A, the second image quality adjusting circuit 50B, the image outputting portion 70, and the like.

Referring now to FIG. 7, the controller 20 includes a processor (CPU) 21, an interface 22, a ROM 23, a RAM 24, and the like. The controller 20 controls the display apparatus according to a program stored in the ROM 23 in a comprehensive manner. Also, the controller 20 controls a visible range of the first image IM1 and a visible range of the second image IM2, which are separated from each other by superimposing the first image IM1 and the second image IM2 to be displayed on the display portion 100, by adjusting the image quality of at least one of the first image IM1 and the second image IM2 to have a given range.

The controller 20 is connected to a camera 310, a compact disc/mini disc (CD/MD) reproducing portion 320, a radio receiver 330, a TV receiver 340, a digital versatile disc (DVD) reproducing portion 350, a hard disc (HD) reproducing portion 360, a navigation portion 370, and the like, so as to send and receive data and control the afore-described components, which are mounted on a vehicle and respectively serve as supply sources supplying images and sounds, as illustrated in FIG. 6. The camera 310 captures images of surroundings and the like of the vehicle. The CD/MD reproducing portion 320 reproduces music or images. The radio receiver 330 receives radio waves via an antenna. The TV receiver 340 receives TV waves via an antenna through a selector 341. The DVD reproducing portion 350 reproduces music information and images in a DVD. The HD reproducing portion 360 reproduces images and music information stored in a HD. The navigation portion 370 outputs maps or route guide images on the basis of road information received by a VICS information receiver 371 and geographic information received by a GPS information receiver 372.

Additionally, the controller 20 is also connected to an external memory 140, the operation button portion 150, a remote control send and receive portion 170, a brightness detecting sensor 190, a passenger detecting sensor 200, and the like, and enables various controls on the basis of various kinds of data obtained from the afore-mentioned components. The external memory 140 stores various kinds of data. The operation button portion 150 is provided for operating the display apparatus. The remote control send and receive portion 170 sends and receives infrared signals or wireless signals between a remote controller 171 provided for controlling the display apparatus remotely. The brightness detecting sensor 190 is composed of a light switch or a light sensor to detect the brightness inside the vehicle. The passenger detecting sensor 200 is composed of a pressure-sensitive sensor or the like on the driver's seat or the front passenger's seat to detect a passenger in the vehicle.

The distribution circuit 30, as illustrated in FIG. 6, distributes sound data and image data supplied from the above-described camera 310, the CD/MD reproducing portion 320, the radio receiver 330, the TV receiver 340, the DVD reproducing portion 350, the HD reproducing portion 360, the navigation portion 370, and the like, to the first image quality adjusting circuit 50A or the second image quality adjusting circuit 50B, according to a control instruction issued by the controller 20.

A sound adjusting circuit 60 adjusts the sound data supplied from the distribution circuit 30 to output to a speaker 61, as illustrated in FIG. 6.

Each of the first image quality adjusting circuit 50A and the second image quality adjusting circuit 50B, by reference to FIG. 8, includes a contrast adjusting portion 51, a brightness adjusting portion 52, a color tone adjusting portion 53, a gamma value adjusting portion 54, and the like, and respectively adjusts the image qualities (contrast, brightness, color tone, and gamma value) of the first image data and the second image data, in response to the control instruction issued by the controller 20.

Referring now to FIG. 9, the image outputting portion 70 includes a first write circuit 71, a second write circuit 72, a video RAM (VRAM) 73, a liquid crystal panel driving portion 74, and the like. The first image data and the second image data, image qualities of which have respectively been adjusted by the first image quality adjusting circuit 50A and the second image quality adjusting circuit SOB, are respectively written into the first write circuit 71 and the second write circuit 72. The first write circuit 71 and the second write circuit 72 respectively write the first image data and the second image data into given addresses of the VRAM 73, in order to superimpose such adjusted first image data and such adjusted second image data.

The VRAM 73 retains the image data on which the first image data and the second image data are superimposed. Such superimposed image data corresponds to respective pixels of the display portion 100. The liquid crystal panel driving portion 74 is a circuit that drives a liquid crystal panel 110, and also drives the corresponding pixels of the liquid crystal panel 110, on the basis of the superimposed image data retained in the VRAM 73. The liquid crystal panel 110 will be described later in detail.

The display portion 100 includes: the liquid crystal panel 110; a backlight portion 120; a touch panel 130; and the like, as illustrated in FIG. 10. The backlight portion 120 sheds illuminated lights from the back surface of the liquid crystal panel 110. The touch panel 130 is provided for inputting a signal to operate the display apparatus. Here, the touch panel 130 is not shown, yet is formed in a shape of transparent sheet and adhered to the front surface of the liquid crystal panel 110.

Referring now to FIG. 11, the liquid crystal panel 110 has a known structure. Sequentially from the backlight portion 120, there are provided a first deflecting plate 111, a thin film transistor (TFT) substrate 112, a liquid crystal layer 113, a color filter substrate 114 having pixels for three primary colors of RGB, a parallax barrier 115, a glass plate 116, a second deflecting plate 117, and the like.

The above-described liquid crystal panel 110 has a display screen in which, for example, 800 pixels are arranged in a horizontal direction and 480 pixels in a vertical direction, as illustrated in FIG. 10 and FIG. 11. Also, left-hand side display pixels 118 (hereinafter, also referred to as front passenger's display pixel 118) and right-hand side display pixels 119 (hereinafter, also referred to as driver's display pixel 119) are alternately arranged in a horizontal direction of the display screen.

The parallax barrier 115 is formed in a stripe-shaped manner, and includes shielding portions and transmitting portions, as illustrated in FIG. 10 and FIG. 11. The shielding portions are arranged between the left-hand side display pixels 118 and the right-hand side display pixels 119. By providing the parallax barrier 115 on the front surface of the color filter substrate 114, among the illuminated lights that have passed through the left-hand side display pixels 118, only the lights going towards the left side selectively pass through the transmitting portions of the parallax barrier 115. Among the illuminated lights that have passed through the right-hand side display pixels 119, only the lights going towards the right side selectively pass through the transmitting portions of the parallax barrier 115. This makes the first image IM1 visible from the right side (the driver's seat) of the liquid crystal panel 110, and also makes the second image IM2 visible from the left side (the front passenger's side). Here, a similar parallax barrier as disclosed in Japanese Patent Application Publication No. 10-123461 or Japanese Patent Application Publication No. 11-84131 may be employed for the parallax barrier 115.

The TFT substrate 112, by reference to FIG. 12, includes a data line drive circuit DR1, a scanning line drive circuit DR2, vertically arranged scanning lines SCL, horizontally arranged data lines DTL, TFT elements EL, pixel electrodes EP corresponding to the TFT elements EL, and the like, whereas each of the TFT elements EL is formed in each region where each of the scanning lines SCL and each of the data lines DTL are crossed. Sub pixels SBP are formed by regions surrounded by the scanning lines SCL and the data lines DTL, and the sub pixels SBP arranged along each of the data lines DTL are alternately assigned to the left-hand side display pixels 118 and the right-hand side display pixels 119. A drive timing of the data line drive circuit DR1 is controlled by the liquid crystal panel driving portion 74 to control a voltage applied to the pixel electrode EP. A Drive timing of the scanning line drive circuit DR2 is controlled by the liquid crystal panel driving portion 74 to selectively scan the TFT element EL.

Figure 1:
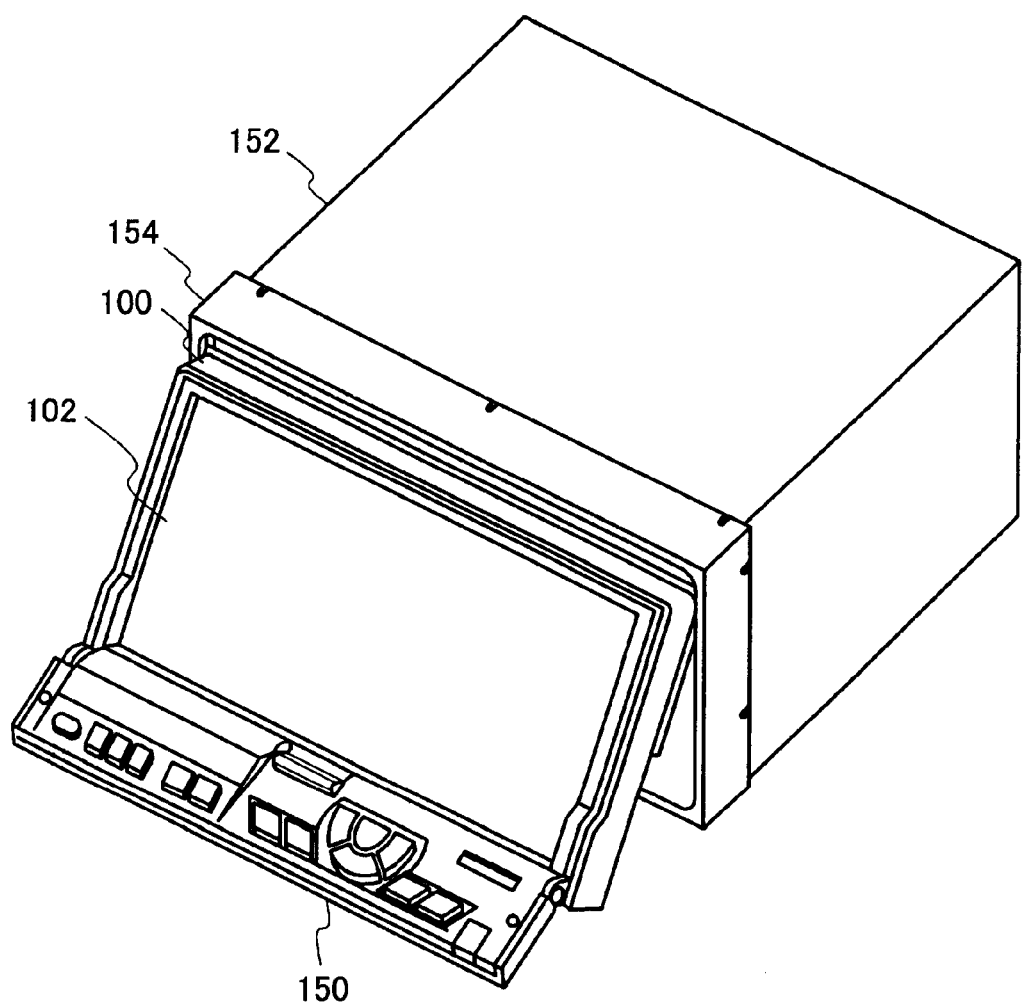
FIG. 1 is a first external view of a conventional display apparatus.
Figure 2:
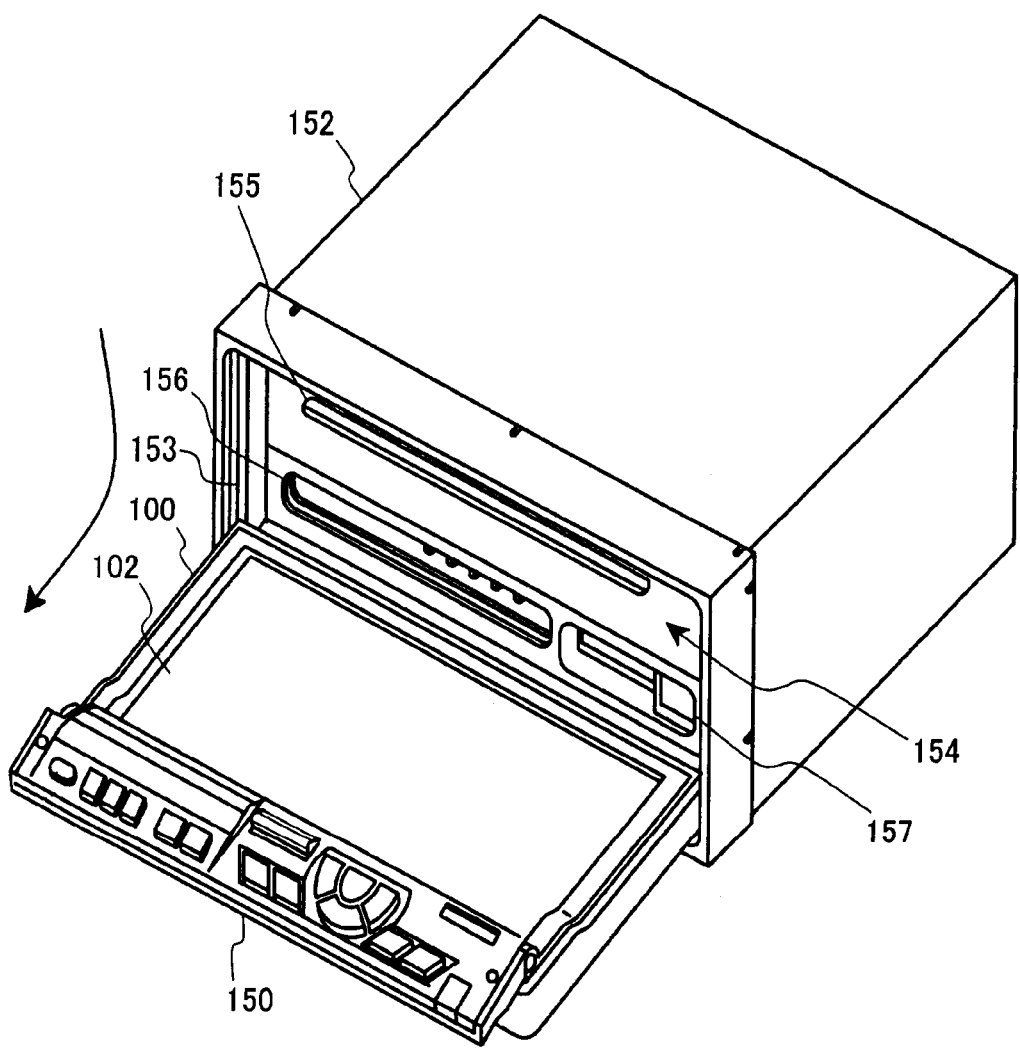
FIG. 2 is a second external view of the conventional display apparatus.
Figure 13:
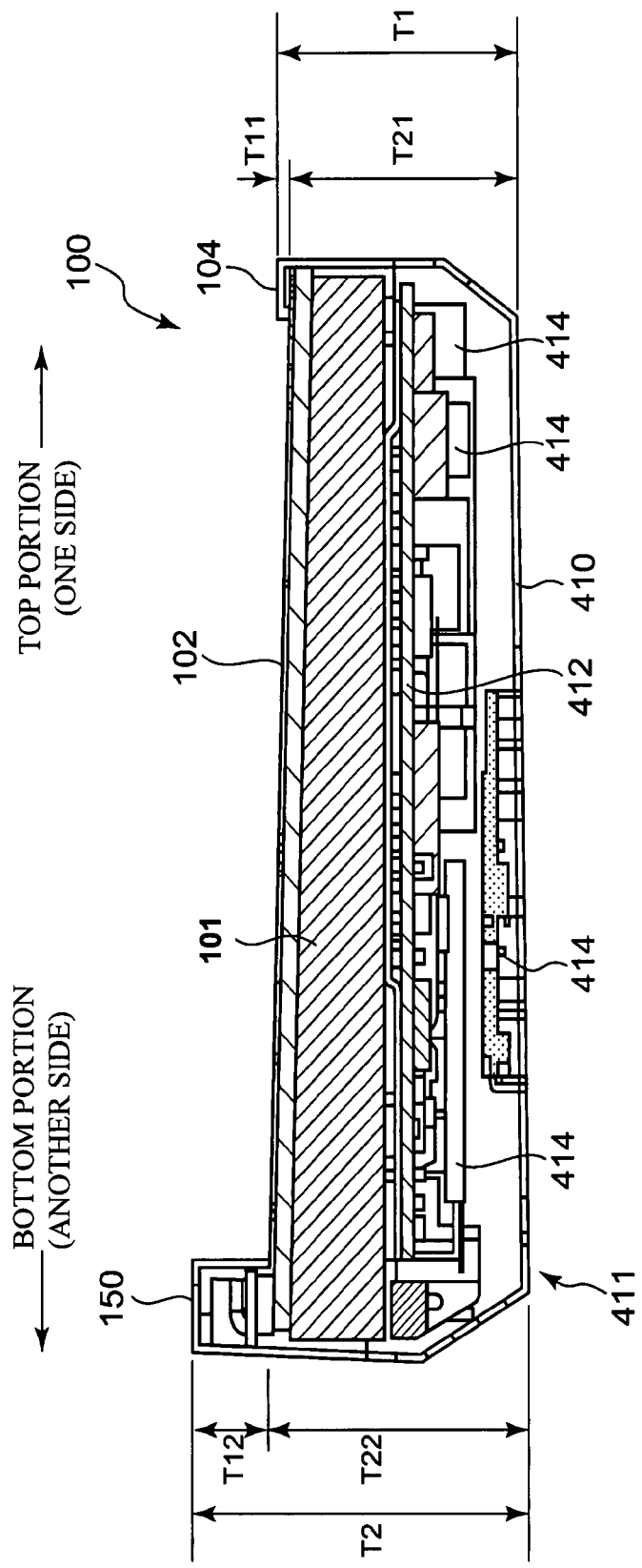
FIG. 13 is a cross-sectional view of the display portion.

FIG. 13 is a cross-sectional view of the display portion 100. The display portion 100 moves in a similar manner as the description given with reference to FIG. 2. That is to say, the top portion of the display portion 100 can be tilted and moved downward to the bottom portion of the main body 152, by use of the drive pin serving as a driving portion provided at the side surface of the display portion 100 and the drive groove 153 formed in the main body 152. The right-hand side of FIG. 13 corresponds to the top portion of the display portion 100, while the display portion 100 keeps covering the front surface of the main body 152. In other words, the right-hand side of FIG. 13 corresponds to one side of the display portion 100 brought into proximity to the main body 152, while the operating portion 154 is being exposed. The left-hand side of FIG. 13 corresponds to the bottom portion (another side) of the display portion 100. The top of FIG. 13 corresponds to the front surface of the display portion 100. The bottom of FIG. 13 corresponds to the back surface of the display portion 100.

The front surface of the display portion 100 corresponds to the display screen 102, and is provided with: the operation button portion 150 at the bottom portion thereof; and a switch portion 104 for the touch panel at the top portion thereof. A display panel 101 is provided at the front surface of the display portion 100, and the display screen 102 is provided at the front surface of the display panel 101. A substrate 412 is provided at the back surface of the display panel 101, and electronic parts 414 are provided on the substrate 412 to compose a circuit that controls the display panel 101. The display portion 100 is covered with a chassis 410 except the display screen 102.

At the top portion of the display portion 100, a thickness T1 from the front surface of the display portion 100 to a back surface 411 thereof is a sum of: a thickness T11 of the switch portion 104 for the touch panel, protruding toward the front surface side from the display screen 102; and a thickness T21 from the display screen 102 to the back surface 411 of the display portion 100. Meanwhile, at the bottom portion of the display portion 100, a thickness T2 from the front surface of the display portion 100 to the back surface 411 thereof is a sum of: a thickness T12 of the operation button portion 150 protruding toward the front surface side from the display screen 102; and a thickness T22 from the display screen 102 to the back surface 411 of the display portion 100. Here, T1 is, for example, 24 mm, T2 is, for example, 33.5 mm, T21 is, for example, 21 mm, and T22 is, for example, 24.5 mm.

Figure 14:
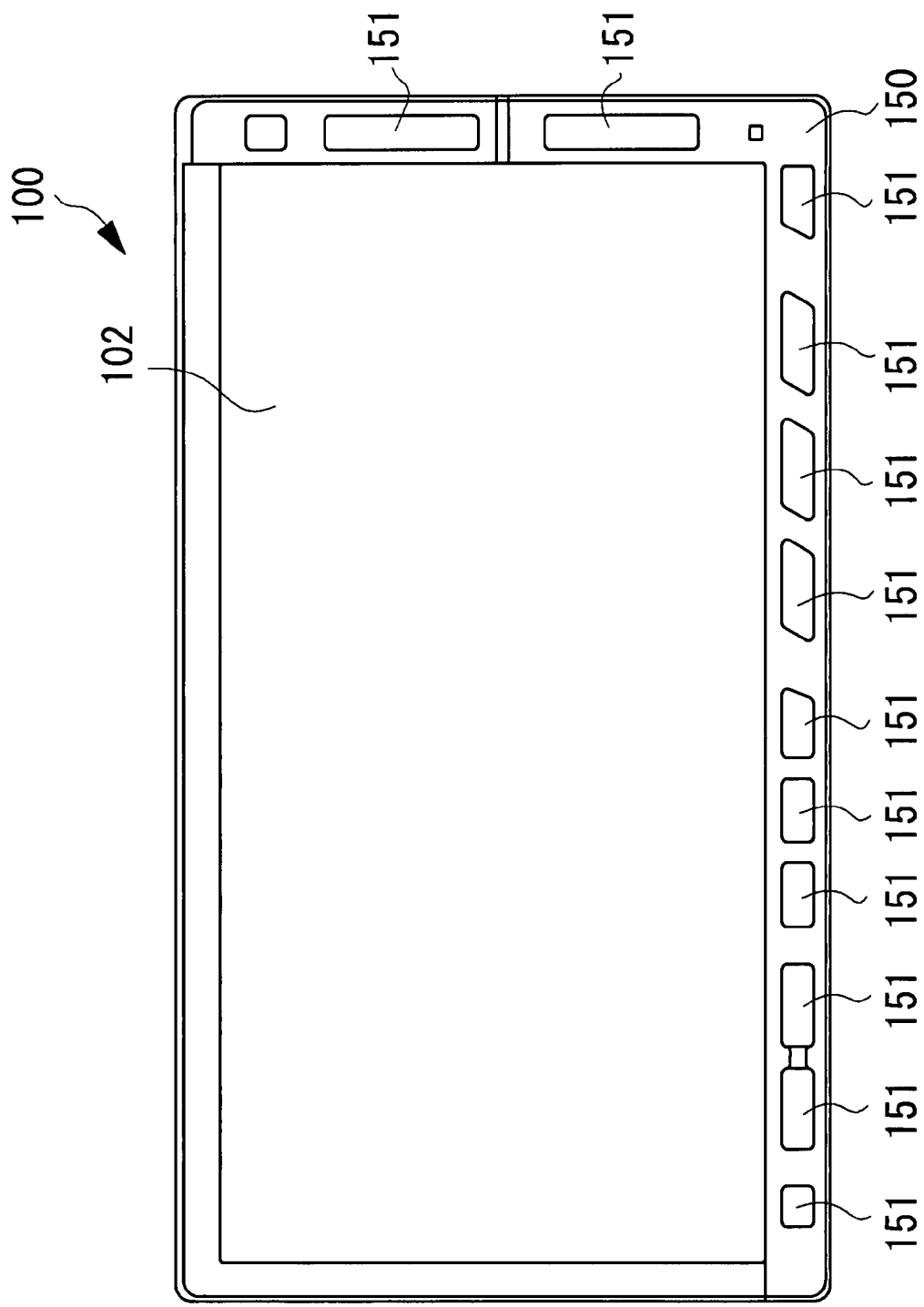
FIG. 14 is a front view of the display portion.
Figure 15:
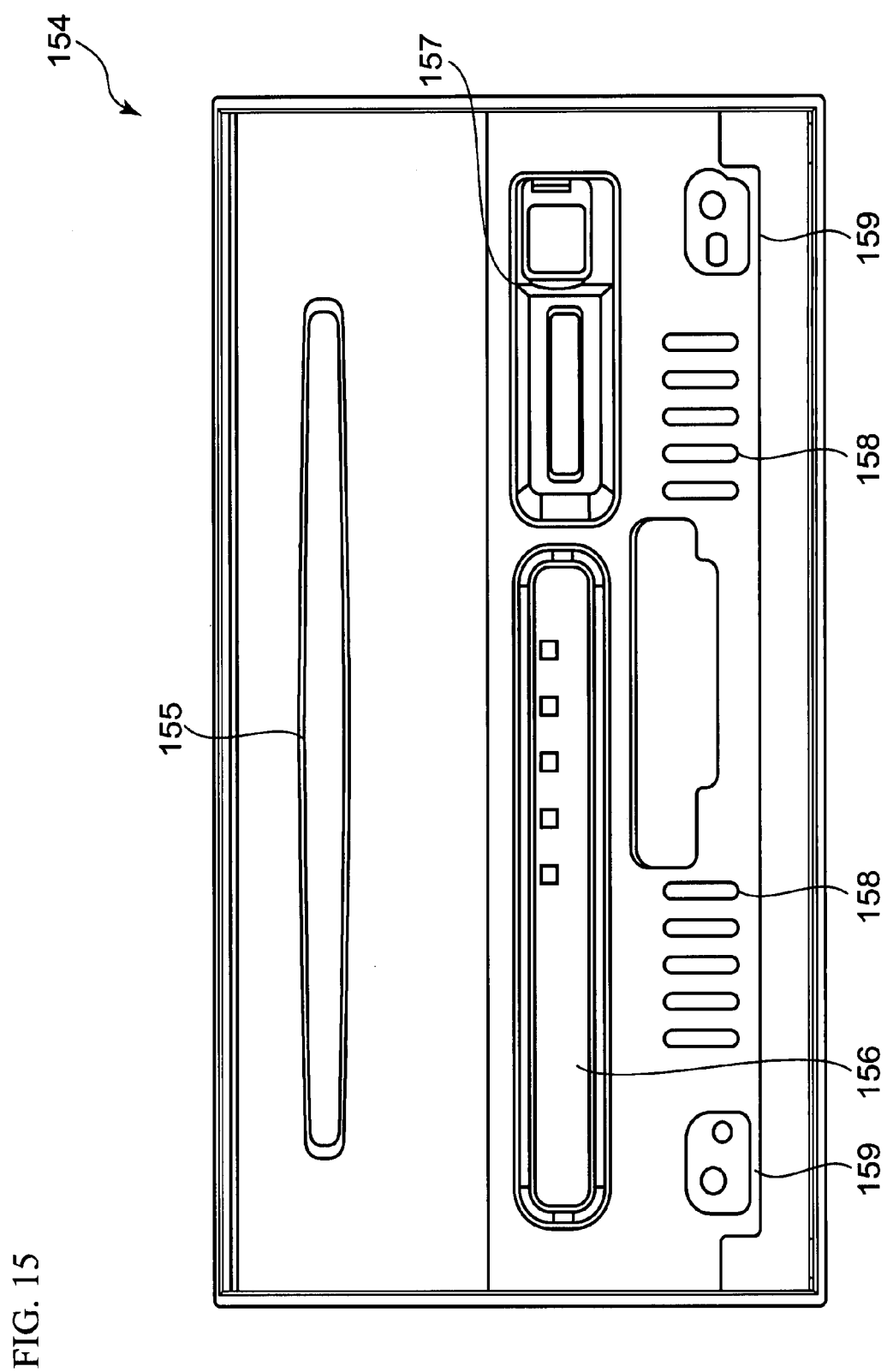
FIG. 15 is a front view of a main body.

FIG. 14 is a front view of the display portion 100. There are provided the operation button portion 150 having multiple operation buttons 151 at the bottom portion and at the right-hand portion of the display screen 102. FIG. 15 is a front view of the main body 152. The operation portion 154 is provided with: the CD/DVD insertion slot 155; the MD insertion slot 156; the HDD connector insertion slot 157; a connector insertion slot 159 for the display portion 100; and a ventilating opening 158. Here, the CD/DVD insertion slot 155, the MD insertion slot 156, and the HDD connector insertion slot 157 are demanded to be operable from the front surface when the display portion 100 is opened. In FIG. 14, the operation buttons 151 are arranged at one side (the right-hand portion) of the display portion 100. However, the present invention is not limited thereto. For example, the operation buttons 151 may be provided at only the bottom portion of the display portion 100.

Figure 16A:
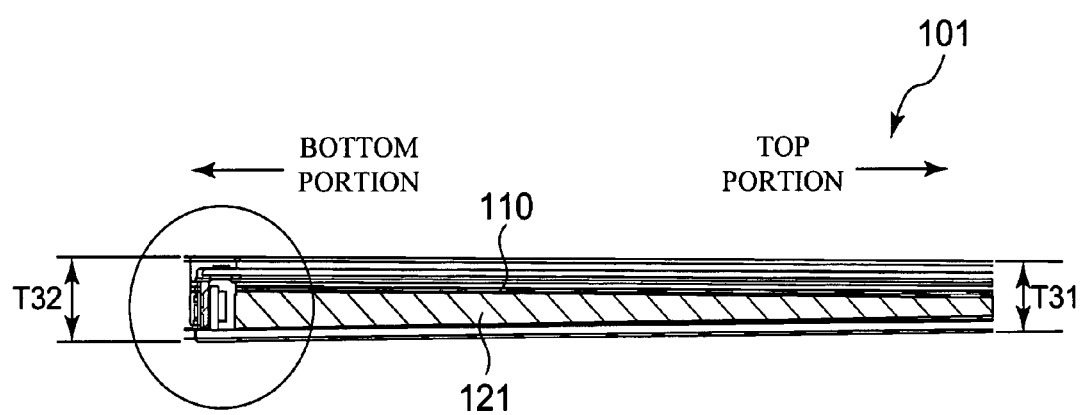
FIG. 16A is a cross-sectional view of a display panel.
Figure 16B:
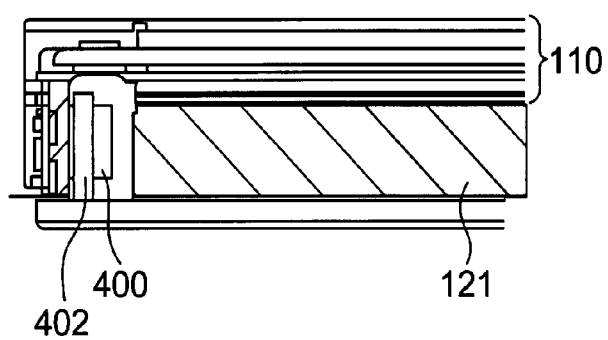
FIG. 16B is an enlarged view of the circle shown in FIG. 16A.

FIG. 16A is a cross-sectional view of the display panel 101. FIG. 16B is an enlarged view of the circle shown in FIG. 16A. The liquid crystal panel 110 is provided at the front surface of the display panel 101. The configuration of the liquid crystal panel 110 is same as that shown in FIG. 10, and a detailed explanation will be omitted. A light guide panel 121 is provided at the back surface of the liquid crystal panel 110. There is provided a light emitting diode (LED) array 402 that includes at least one white LED 400, at the bottom portion of the light guide panel 121. The light emitted from the white LED 400 enters the light guide plate 121, and is emitted from the front surface of the display panel 101. In this manner, the LED array 402 including at least one white LED 400 and the light guide plate 121 serve as the backlight portion 120 shown in FIG. 10. At the top portion of the display panel 101, a thickness T31 is, for example, 6.5 mm, and at the bottom portion thereof, a thickness T32 is, for example, 9 mm.

According to the first exemplary embodiment of the present invention, as shown in FIG. 13, at the top portion of the display portion 100, namely, at one side of the display portion 100 brought into proximity to the main body 152, the thickness T21 from the display screen 102 to the back surface 411 is smaller than the thickness T22 from the display screen 102 to the back surface 411 at the bottom portion of the display portion 100, namely, at another side of the display portion 100. With such configuration, it is possible to enlarge the region R that can be used for the operating portion 154 at the front surface of the main body 152. Even if the display portion 100 has a small tilting angle, it is possible to retain the region that can be used for the operating portion 154 sufficiently and to shorten the time for driving the display portion 100. In this manner, it is possible to enlarge the exposed surface of the front surface of the main body 152 with the movement of the display portion 100 suppressed to minimum. In particular, it is preferable that the thickness T1 from the front surface of the display portion 100 to the back surface 411 thereof, at the top portion of the display portion 100, should be smaller than the thickness T22 from the front surface of the display portion 100 to the back surface 411 thereof, at the bottom portion of the display portion 100. Even if there are provided members projecting toward the front surface side from the display screen 102 at the top portion of the display portion 100 employed in the first exemplary embodiment, it is possible to enlarge the region R that can be used for the operating portion 154 at the front surface of the main body 152. As shown in FIG. 15, even if there are provided the CD/DVD insertion slot 155, the MD insertion slot 156, and the HDD connector insertion slot 157, it is possible to operate the afore-described insertion slots with ease.

Referring to FIG. 16A again, preferably, the display portion 100 includes the display panel 101, and the thickness T31 at the top portion of the display panel 101 is made smaller than the thickness T32 at the bottom portion of the display panel 101. It is therefore possible to make the thickness T21 at the top portion of the display portion 100 smaller than the thickness t22 at the bottom portion thereof, by making the thickness T31 at the top portion of the display panel 101 smaller than the thickness T32 at the lower portion thereof. Preferably, the display portion 100 includes the light guide panel 121, and the thickness of the light guide panel 121 at the top portion (at one side) is smaller than that at the bottom portion (at another side). This makes it possible to make the thickness T21 of the display portion 100 at the top portion thereof smaller than the thickness T22 thereof at the bottom portion thereof.

Referring to FIG. 16B again, preferably, the display portion 100 includes the light emitting portion, for example, the white LED 400, and the light emitting portion is arranged at the bottom portion (another side) of the display portion 100. It is therefore possible to make the thickness of the display panel 101 smaller at the top portion thereof, when the white LED 400 are arranged at the bottom portion thereof instead of those arranged at the top portion thereof. In addition, it is preferable that the white LED 400 are arranged to face the bottom portion (another side) of the light guide plate. It is therefore possible to increase the brightness at the front surface of the light guide plate 121, by making the thickness at the top portion of the light guide plate 121 smaller than that at the bottom portion thereof and by emitting the light from the white LED 400 from the bottom portion thereof. It is also possible to increase the brightness of the light emitting portion by employing at least one white LED 400 for the light emitting portion, as compared to, for example, the fluorescent tube employed for the light emitting portion. This permits the light emitting portion to be provided only at the bottom portion of the light guide plate 121. It is therefore possible to make the thickness T31 at the top portion of the display panel 101 smaller than the thickness T32 at the bottom portion thereof. This also makes it possible to make the thickness T21 at the top portion of the display portion 100 smaller than the thickness T22 at the bottom portion thereof.

As shown in FIG. 15, preferably, there are provided insertion slots 155 and 156 into which the storage media such as CD, DVD, MD, semiconductor memory, and the like can be inserted. Such storage medium is inserted into or ejected from the slot, while the storage medium is being held. Since a region for the operation portion 154 is particularly needed in front of the main body 152, it is effective to apply the technique of the present invention.

In addition, in accordance with the first exemplary embodiment, there is a demand for the high brightness of the backlight portion 120 in the multi-view display on which the first image and the second image can be respectively viewed from different viewing angles. This may increase the thickness of the display portion 100. It is therefore effective to apply the technique of the present invention.

Furthermore, in addition to the method of making the thickness T31 at the top portion of the display panel 101 smaller than the thickness T32 at the bottom portion thereof, it is possible to make the thickness T21 at the top portion of the display portion 100 smaller than the thickness T22 at the bottom portion thereof, by, for example, arranging the members 414 included in the chassis 410 at the bottom portion of the display portion 100.

The display apparatus employed in the first exemplary embodiment may be applicable to any other display apparatus. In many cases, however, the display portion of the in-vehicle display apparatus is configured to cover the front surface of the main body of the in-vehicle display apparatus and to provide the insertion slots for the storage media at the front surface of the main body. This is the reason it is effective that the display apparatus employed in the first exemplary embodiment be used for the in-vehicle display apparatus.

In the first exemplary embodiment of the present invention, the operation portion 154 is exposed by moving and tilting the top portion of the display portion 100 downward to the bottom portion of the main body 152. As stated heretofore, it is configured such that the top portion (one side) of the display portion 100 is brought into proximity to the main body 152. It may be configured such that the thickness at any side of the display portion 100 brought into proximity of the main body 152 is made smaller than that at another side thereof, according to the moving direction.

In the above-described exemplary embodiments, the description has been given of the liquid crystal display apparatus mounted in a vehicle as an example. However, the present invention is not limited thereto, and is applicable to any display apparatus other than the in-vehicle liquid crystal display apparatus.

The description heretofore has been given of a case where the driver sits on a right-hand side in an automobile and the front-seat passenger sits on a left-hand side, however, the present invention is not limited thereto. The driver may sit on a left-hand side and the front-seat passenger may sit on a right-hand side in an automobile.

The present invention is not limited to the above-mentioned exemplary embodiments, and other embodiments, variations and modifications may be made without departing from the scope of the present invention.

The present invention is based on Japanese Patent Application No. 2006-112442 filed on Apr. 14, 2006, the entire disclosure of which is hereby incorporated by reference.

What is claimed is:

1. A display apparatus comprising:
   a main body that includes an operating portion at a front surface thereof; and
   a display portion that includes a display screen that is an LCD and visible when the display portion covers the front surface of the main body, and that exposes the operating portion when the display portion is moved from the front surface of the main body,
   wherein a thickness from the display screen to a back surface at one side of the display portion, which is brought into proximity to the main body when the operating portion is exposed, is made smaller than that from the display screen to the back surface at another side of the display portion,
   the back surface of the display portion is at an approximately right angle to each of a one side surface of the display portion and an other side surface of the display portion, and
   the display screen is at an angle other than a right angle to each of the one side surface of the display portion and the other side surface of the display portion.

2. The display apparatus as claimed in claim 1, wherein the display portion includes a light guide plate and the thickness of the light guide plate at the one side is made smaller than the thickness of the light guide plate at the another side.

3. The display apparatus as claimed in claim 2, wherein the display portion includes a light emitting portion arranged at the another side of the light guide plate.

4. The display apparatus as claimed in claim 3, wherein the light emitting portion includes at least one light emitting diode (LED) that faces the another side of the light guide plate.

5. The display apparatus as claimed in claim 3, wherein the operating portion is provided with an insertion slot to insert or eject a storage medium into or from.

6. The display apparatus as claimed in claim 2, wherein a surface of the light guide plate is flat.

7. The display apparatus as claimed in claim 1, wherein members in a chassis of the display portion are arranged closer to the another side of the display portion than the one side thereof.

8. The display apparatus as claimed in claim 1, wherein a first image and a second image are displayed on a common display screen to be respectively visible from different viewing angles.

9. An in-vehicle display apparatus comprising:
   a main body that includes an insertion slot at a front surface thereof to insert or eject a storage medium into or from;
   a display portion arranged to cover the front surface of the main body; and
   a driving portion that moves and tilts a top portion of the display portion downward to a bottom portion of the main body to expose the front surface of the main body,
   wherein a thickness from a display screen to a back surface at the top portion of the display portion is made smaller than that from the display screen to the back surface at the bottom portion of the display portion,
   wherein the back surface of the display portion is at an approximately right angle to each of a top portion surface of the display portion and a bottom portion surface of the display portion, and
   the display screen is an LCD and at an angle other than a right angle to each of the top portion surface of the display portion and the bottom portion surface of the display portion.

10. The in-vehicle display apparatus as claimed in claim 9, wherein:
   the display portion includes a light guide plate and the thickness at the top portion of the display portion is made smaller than that at the bottom portion of the display portion; and
   a surface of the light guide plate is flat.

* * * * *